United States Patent

Harman, III et al.

[15] 3,652,227
[45] Mar. 28, 1972

[54] NITRIC OXIDE ANALYSIS

[72] Inventors: John N. Harman, III, Placentia; Radhakrishna M. Neti, Brea, both of Calif.

[73] Assignee: Beckman Instruments, Inc., Fullerton, Calif.

[22] Filed: Dec. 15, 1969

[21] Appl. No.: 885,007

[52] U.S. Cl..................23/232 R, 23/2 S, 23/159, 23/253 TP, 23/254, 252/463
[51] Int. Cl................B01d 53/34, C01b 21/46, G01n 31/10
[58] Field of Search..................23/232, 253, 2 S, 159, 254

[56] References Cited

OTHER PUBLICATIONS

Spanily, V., Chem. Abstr. 50, 3737 f. (1956)
Ganz et al., et al., Chem. Abstr. 57, 3245 f. (1962)
Rossano et al., Chem. Abstr. 60, 4753 f. (1964)

Primary Examiner—Joseph Scovronek
Assistant Examiner—R. M. Reese
Attorney—Robert J. Steinmeyer and William F. McDonald

[57] ABSTRACT

Method and apparatus for determining the nitric oxide content of a sample gas stream. The nitric oxide in the gas stream is reacted with an excess amount of ozone so as to completely convert the nitric oxide into nitrogen dioxide. The resulting gas containing nitrogen dioxide and residual ozone is passed through a scrubber which removes the ozone and does not affect the nitrogen dioxide content of the gas. The resulting gas is then analyzed for its $NO_2$ content, which is a function of the nitric oxide content of the sample gas. The method and apparatus may also be utilized for determining the total amount of nitrogen dioxide and nitric oxide in a sample gas. The invention is particularly applicable to the monitoring of air for air pollution control.

24 Claims, 2 Drawing Figures 3,652,227

INVENTORS
R. M. NETI
J. N. HARMAN III
BY *Thomas L. Peterson*
ATTORNEY

NITRIC OXIDE ANALYSIS

CROSS-REFERENCE TO RELATED APPLICATIONS

This application is related to or embodies some of the features disclosed in our copending application entitled "$NO_2$ Analysis and Scrubber Therefor," Ser. No. 885,006, filed concurrently herewith, and copending application of R. M. Neti entitled "Scrubber Apparatus", Ser. No. 747,721, filed July 25, 1968, now U.S. Pat. No. 3,579,305 issued May 18, 1971, both of which applications are assigned to the assignee of the present application.

BACKGROUND OF THE INVENTION

This invention relates generally to gas analysis and, more particularly, to an improved method and apparatus for determining the nitric oxide content of a gas sample stream. The invention is also applicable to the determination of the total amount of nitric oxide and nitrogen dioxide in a gas.

Nitric oxide exists in the atmosphere in conjunction with nitrogen dioxide as common air pollutants. In order that dangerous levels of these constituents may be known and corrective measures may be taken, means is required for practically and inexpensively determining the level of these constituents in air. The present invention is directed primarily to the determination of nitric oxide in air, but is also applicable to the determination of the total nitric oxide and nitrogen dioxide content of air. While the description of the present invention is directed primarily to the determination of these constituents in air, it is to be understood that the invention is also applicable to the determination of such constituents in other gaseous media.

The conventional analytical technique for the determination of nitric oxide is called the Saltzman method and is described in detail in United States Public Health Service Publication No. 999–AP–11. In the Saltzman method, nitric oxide in air is converted into an equivalent amount of nitrogen dioxide by passage of the air through a permanganate bubbler which chemically oxidizes the nitric oxide. A colorimetric analysis is utilized to determine the $NO_2$ content of the resulting gas. This analysis involves the absorbing of the $NO_2$ in a suitable absorbing reagent. Within about fifteen minutes a red-violet color appears in the reagent which may be read visually by comparing with suitable color standards or transferred to a cuvette and read by an appropriate instrument such as a spectrophotometer. In similar methods of determining nitric oxide in air, $K_2Cr_2O_7$ is employed as the oxidizing solution for the conversion of NO to $NO_2$ or the sample air stream is passed through an oxidant impregnated medium, such as a filter impregnated with $CrO_3$. While the colorimetric method of analyzing $NO_2$ is quite satisfactory, the aforementioned techniques for converting nitric oxide into $NO_2$ suffer from several deficiencies. As stated in the aforementioned Public Health Service Publication, the conversion efficiency of nitric oxide to nitrogen dioxide by a permanganate bubbler may be commonly as low as 70 percent. The other methods mentioned above for converting nitric oxide to nitrogen dioxide also suffer from less than 100 percent conversion efficiency of nitric oxide to nitrogen dioxide. In addition, the aforementioned oxidizer mediums have limited lives, on the order of only about one week, while functioning at their maximum conversion efficiencies. Also, when using an oxidizing solution, there is the possibility that some of the solution may be carried over into the absorbing reagent utilized in the colorimetric analytical process, thus resulting in errors in the determination of $NO_2$. The aforementioned oxidation techniques further suffer from the disadvantage that the conversion efficiency of NO to $NO_2$ depends upon the level of humidity in the air sample. Thus the determination of nitric oxide in air by the aforementioned methods is dependent upon the humidity content of the air. In addition, the aforementioned oxidizer mediums often require complex sample handling equipment. Therefore, what is needed is an improved method and apparatus for determining the nitric oxide content of air which will avoid some if not all of the aforementioned deficiencies in the conventional techniques for determining nitric oxide.

SUMMARY OF THE INVENTION

The principal object of the present invention is to provide an improved method and apparatus for determining nitric oxide in a sample gas stream.

Another object of the invention is to provide a method and apparatus for determining the total amount of nitric oxide and nitrogen dioxide in a gas sample.

According to the principal aspect of the present invention, nitric oxide in air or other sample gas is reacted with at least the stoichiometric amount, preferably an excess amount, of ozone so as to completely convert the nitric oxide into nitrogen dioxide. The resulting gas stream containing nitrogen dioxide and residual ozone is then passed through a scrubber which removes the ozone from the gas but does not affect the nitrogen dioxide content thereof. Thereafter, the nitrogen dioxide content of the gas is determined as a measure of the nitric oxide content of the initial air stream. If the sample contains nitrogen dioxide as well as nitric oxide, the aforementioned method and apparatus will provide a measure of the total nitric oxide and nitrogen dioxide content of the air stream. If the air stream is to be monitored for its nitric oxide content alone and it contains $NO_2$ and species which will react with ozone to produce interferents to which the $NO_2$ analyzer is sensitive, the air stream is initially passed through a scrubber which will remove $NO_2$ and such species prior to reacting the air stream with ozone. The method and apparatus of the present invention have the advantage that they are simple, inexpensive and permit the rapid and continuous monitoring of the NO or NO plus $NO_2$ content of an air stream. Moreover, by the use of ozone as the oxidant in the present invention for converting NO into $NO_2$, most if not all of the deficiencies present in the aforementioned prior art techniques of nitric oxide analysis are overcome.

Other objects, aspects and advantages of the invention will become more apparent from the following description taken in connection with the accompanying drawing.

DESCRIPTION OF THE PREFERRED EMBODIMENTS

Figure 1:
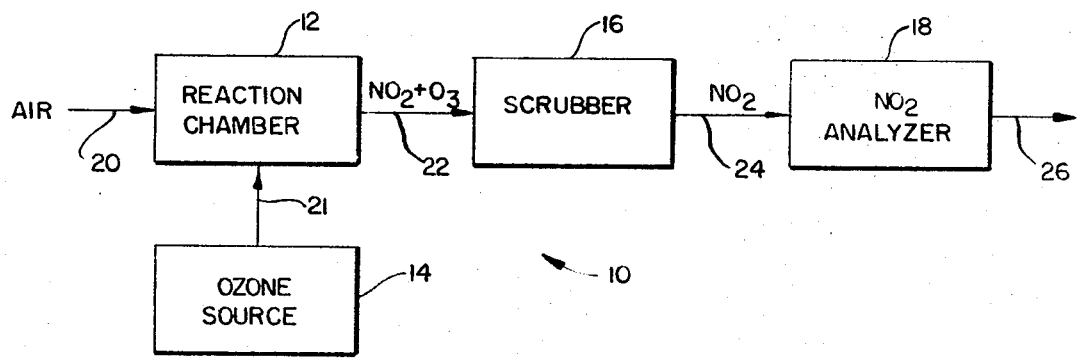
FIG. 1 is a schematic view of a simplified form of the invention utilized for determining either NO alone or in combination with $NO_2$.

Referring now to FIG. 1 in detail, there is illustrated a simplified form of the apparatus of the present invention, generally designated 10. The apparatus 10 includes a reaction chamber 12, ozone source 14, scrubber 16 and nitrogen dioxide analyzer 18. The chamber 12 has a sample inlet 20 for continuously conveying air or other sample gas into the chamber. The ozone source is connected to the reaction chamber by means of a conduit 21. The ozone source may comprise a pressurized tank containing ozone which may be bled into the reaction chamber via the conduit 21. The source 14 may also comprise means for generating ozone in situ such as will be described later in connection with FIG. 2. The scrubber 16 is connected to the reaction chamber 12 by means of a conduit 22 while the $NO_2$ analyzer 18 is connected to the scrubber by a conduit 24. Thus, an air stream entering the inlet 20 will pass in sequence through the reaction chamber 12, scrubber 16 and $NO_2$ analyzer 18 and will exit therefrom via a vent 26.

The scrubber 16 contains a material which is capable of scrubbing or removing ozone and other species contained in a sample air stream which will interfere with the analysis of $NO_2$ by the analyzer 18, yet will not affect the $NO_2$ content of the gas introduced into the scrubber. Such a suitable material is argentic oxide (AgO) which is capable of scrubbing ozone, $SO_2$, $H_2S$, halogen gases, mercaptans and other organic sulfur compounds with better than 90 percent efficiency yet does not affect the $NO_2$ content of an air stream passing therethrough. If air is the sample gas, the scrubber should contain less than 2 grams AgO and preferably about 1 gram to prevent delay in the transmission of $NO_2$ therethrough. Preferably the AgO is in the form of small granules. The AgO scrubber material and its characteristics are described in greater detail in our aforementioned copending application entitled "$NO_2$ Analysis and Scrubber Therefor."

The $NO_2$ analyzer 18 may comprise a colorimetric instrument such as utilized in the aforementioned Saltzman method described in Public Health Service Publication No. 999–AP–11, and thus will include an absorbing reagent and an instrument for determining color change, such as a spectrophotometer. Preferably, however, the $NO_2$ analyzer is a coulometric galvanic cell of the type disclosed in U.S. Pat. No. 3,314,864 to Hersch. This cell contains a body of aqueous halide electrolyte in which there is immersed a cathode of inert conductive material, such as platinum or graphite, and an anode of either active carbon, calomel or silver chloride. If air containing $NO_2$ is introduced into the cell, it will dissolve in the electrolyte and the following reactions will take place if a potassium iodide electrolyte is employed:

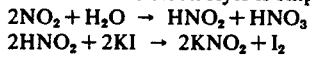

$$2NO_2 + H_2O \rightarrow HNO_2 + HNO_3$$
$$2HNO_2 + 2KI \rightarrow 2KNO_2 + I_2$$

Thus, the $NO_2$ in the air sample oxidizes the iodide ions in the electrolyte to form iodine. The iodine bearing electrolyte is passed over the cathode in the cell where the iodine is reduced back to iodide ions. A galvanic current is generated by the electrode pair in the cell which is a function of the rate of entry of the $NO_2$ into the cell electrolyte, and thus a measure of the level of the $NO_2$ in the gas being introduced into the cell. Preferably a current amplifier and meter which may be used in conjunction with a recorder, not shown, is coupled to the electrodes of the Hersch cell to provide a continuous visual indication of the current output of the cell.

The apparatus 10 may be utilized for determining the nitric oxide content of air alone if the air sample does not contain $NO_2$ or certain species which will react with ozone to produce interferents that are not removed by the scrubber 16 and thus would interfere in the analysis of $NO_2$ by the analyzer 18. Such a species is $SO_2$ which may react with ozone to form $SO_3$, that will pass through the scrubber 16 and interfere in the analysis performed by the $NO_2$ analyzer 18. To determine the nitric oxide content of an air stream which is free of such a species and $NO_2$, the air stream is continuously conveyed directly into the reaction chamber 12 via the inlet 20. In the chamber 12 the nitric oxide will react with ozone which is bled into the chamber from the source 14. The ozone concentration must be the stoichiometric amount, and preferably an excess amount, required to completely convert the nitric oxide in the sample air stream to nitrogen dioxide. The reaction between ozone and nitric oxide occurring in the chamber 12 may be represented as follows:

$$NO + O_3 \rightarrow NO_2 + O_2$$

The effluent from the reaction chamber 12 containing an equivalent amount of $NO_2$, residual ozone and interferents contained in the sample gas stream is conveyed to the scrubber 16 via the conduit 22. The silver oxide in the scrubber removes the common interferents found in air as well as ozone but does not react or absorb $NO_2$ in the gas stream. Thus, the scrubber 16 permits the quantitative transmission of $NO_2$ in the gas stream into the analyzer 18 through the conduit 24, and the air stream exits from the analyzer via the vent 26. The analyzer 18 determines the $NO_2$ content of the effluent from the scrubber 16 and thus provides a measure of the nitric oxide content of the sample air stream introduced into the apparatus 10.

It can be appreciated that is the air sample contains nitrogen dioxide as well as nitric oxide, but no species such as $SO_2$ which will react with ozone to form interfering constituents that cannot be removed by the scrubber 16, the apparatus 10 may be employed for determining the total amount of nitric oxide and nitrogen dioxide in an air stream. In this case, the $NO_2$ in the sample air stream will be unaffected by passage through the reaction chamber 12 with the result that the total amount of nitrogen dioxide in the effluent from the chamber 12 will be equivalent to both the nitric oxide in the sample air stream, which is converted to nitrogen dioxide by the ozone in the reaction chamber, and the initial nitrogen dioxide in the sample air stream. Since the silver oxide scrubber does not affect $NO_2$, the output signal of the analyzer 18 provides a measure of the total amount of nitric oxide and nitrogen dioxide in the sample air stream.

Figure 2:
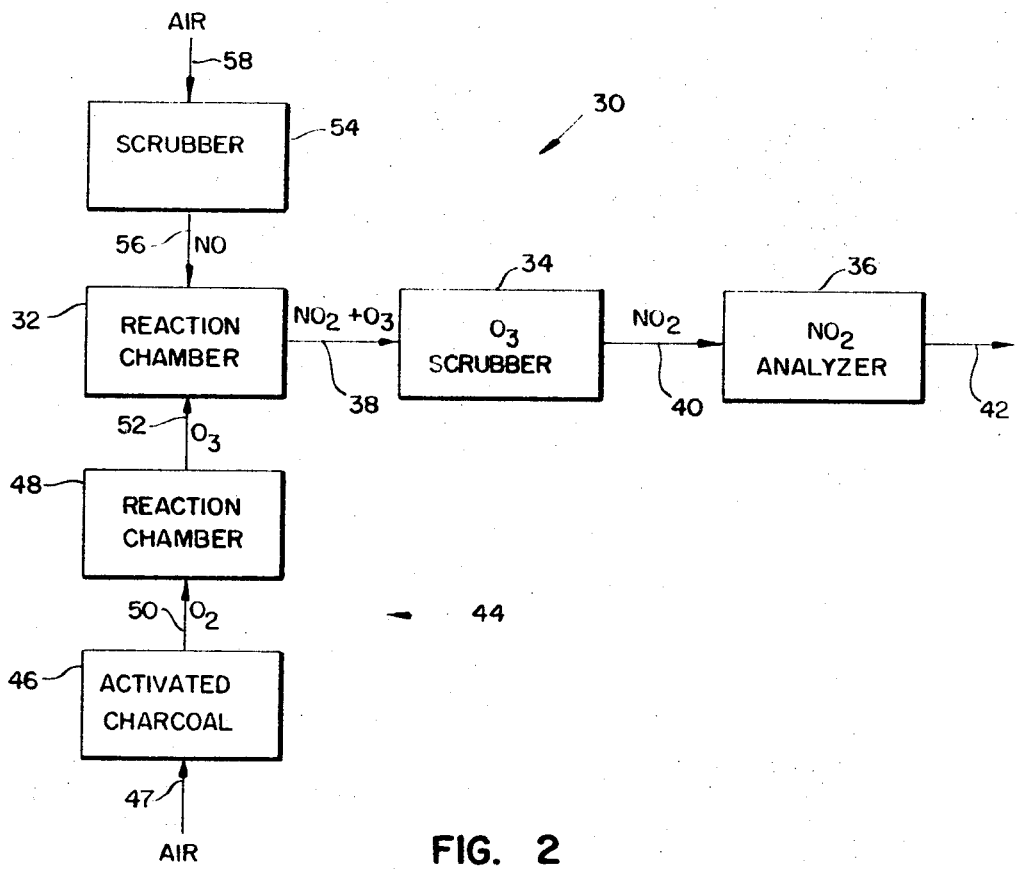
FIG. 2 is a schematic view of the preferred form of the invention utilized for monitoring the NO content of air.

The preferred form of the apparatus of our invention is illustrated in FIG. 2 and is generally designated 30. The apparatus 30 is utilized for determining only the nitric oxide content of an air or other gas stream, and has the advantage over the apparatus 10 in that it is not subject to errors due to interfering species such as $SO_2$.

The apparatus 30 is similar to apparatus 10 in that it employs a reaction chamber 32, ozone scrubber 34 and $NO_2$ analyzer 36. The analyzer may be either one of the types discussed above with respect to analyzer 18. The scrubber 34 is connected to the chamber 32 by means of a conduit 38 while the analyzer 36 is connected to the scrubber 34 by a conduit 40. An outlet 42 is provided on the analyzer 36 for venting the sample stream to atmosphere after analysis thereof.

The ozone source 44 in the apparatus 30 may be the same as the source 14 utilized in apparatus 10, but preferably comprises an apparatus for generating ozone in situ. Such an apparatus includes a scrubber 46 containing a scrubbing material such as activated charcoal which is capable of absorbing all interferents from an air stream so that "clean" air, i.e., a mixture of nitrogen and oxygen, will be emitted from the scrubber. The scrubber 46 is provided with an inlet 47 for introducing air therein. The source 44 also includes a reaction chamber 48 which is connected to the scrubber 46 by means of a conduit 50. The chamber 48 contains means for continuously converting oxygen into ozone. This may comprise a source of ultraviolet radiation for photo-oxidizing oxygen to ozone or a pair of electrodes for generating an electric discharge sufficient to convert the oxygen into ozone. A suitable source of radiation for practicing the present invention is a double bore quartz lamp sold under the trade name Pen-ray Lamp, Model No. 11 SC–1, marketed by Ultra-violet Products Inc. of San Gabriel, California. Obviously any other source of radiation may be employed if it is capable of photo-oxidizing oxygen to ozone. Electric discharge techniques for converting oxygen to ozone are well known in the art and need not be described in detail here. The ozone forming reaction chamber 48 is connected to the reaction chamber 32 by a conduit 52.

The apparatus 30 includes an additional scrubber 54 which is connected to the reaction chamber 32 by a conduit 56 and includes a sample inlet 58. The scrubber 54 contains a material which removes all species in a gas stream which will interfere in the analysis downstream of the scrubber but will not affect the nitric oxide content of the sample air stream. Such a suitable scrubbing material is either $Ca[OH]_2$ or KOH, each of which is capable of efficiently scrubbing $SO_2$, halogens, $NO_2$, $H_2S$, and mercaptans. These scrubber materials and their characteristics are described in greater detail in the aforementioned Neti application. These materials do not scrub ozone. However, this is of no consequence in the instant invention inasmuch as ozone does not interfere in the analysis process since it is ultimately removed by the scrubber 34 from the gas conveyed through the apparatus.

Since the scrubber 54 removes interferents from the sample gas, the scrubber 34, unlike scrubber 16, need only to remove ozone and quantitatively pass $NO_2$. The scrubber 34 may be identical to the scrubber 16, that is, contain AgO which scrubs ozone but does not affect the $NO_2$ content of a gas stream passing therethrough. Alternatively, the ozone in the gas stream entering the scrubber 34 may be removed by thermal decomposition. This would require that the gas passing through the scrubber 34 be heated by a suitable heater, not shown, to greater than about 200° C. at which temperature ozone is decomposed to molecular oxygen. If the $NO_2$ analyzer 36 were a colorimetric instrument, the scrubbing of ozone by thermal decomposition would have the possible disadvantage that some $NO_2$ in the gas passing through the scrubber may be converted to di-nitrogen pentoxide which would affect the colorimetric analysis. However, with the use of the aforementioned Hersch galvanic cell, scrubbing by means of either the use of silver oxide or thermal decomposition may be utilized without any adverse affects on the $NO_2$ analysis of the effluent emanating from scrubber 34.

In operation of the apparatus 30, ambient air is continuously conveyed through inlet 47 into the scrubber 46. The "clean" air from the scrubber 46 passes into the reaction chamber 48 where the oxygen in the air stream is converted to ozone. It is to be understood that the means employed for converting oxygen to ozone in reaction chamber 48 must produce at least the stoichiometric amount, and preferably an excess amount, necessary to completely react with the nitric oxide in the air stream being analyzed. The ozone produced in the reaction chamber 48 is conveyed by the conduit 52 into the chamber 32. The sample air stream being monitored for its nitric oxide content is introduced into the scrubber 54 via the inlet 58. The scrubber 54 will appreciably remove all interferents from the sample air stream, including $NO_2$, but will pass nitric oxide quantitatively and ozone if it is present in the sample air stream. The nitric oxide bearing effluent from the scrubber 54 will pass into the chamber 32 through the conduit 56. In the chamber 32 the nitric oxide in the air will react with ozone produced in the chamber 48 to produce an equivalent amount of nitrogen dioxide. The effluent from the chamber 32 will therefore contain nitrogen dioxide and residual ozone, but no other interferents as is the case in the apparatus 10. The effluent from chamber 32 is then conveyed by the conduit 38 into the scrubber 34 which removes the ozone and thereafter the effluent from scrubber 34 passes through conduit 40 to the $NO_2$ analyzer 36. The analyzer 36 determines the $NO_2$ content of the gas conveyed thereto and therefore provides a measure of the nitric oxide content of the sample air stream initially introduced into the apparatus.

An apparatus as shown in FIG. 2 employing a Model No. 11 SC-1 Pen-ray Lamp for generation of ozone, calcium hydroxide as the initial air scrubber 54, and silver oxide as the ozone scrubber 34, has been successfully employed in both colorimetric and galvanic nitric oxide analyses with the result that the analyses compare quite favorably with the standard Saltzman analytical technique referred to above. Our apparatus, however, has the advantage over the Saltzman technique in that almost 100 percent conversion of NO to $NO_2$ is achieved by the use of the ozone oxidation technique, and there is no possibility of solution carryover from an oxidizing solution into the gas sample train. Also, the analysis is not dependent upon the level of humidity of the sample air being analyzed. Most importantly, when the ozone is generated in situ as by the apparatus 44 using a Pen-ray lamp, for example, there is an unlimited source of the oxidant available to efficiently convert NO to $NO_2$ over a very long period, on the order of 50,000 hours or more, in contrast to the conventional oxidation mediums which remain efficient for only about 1 week. The invention further has the advantage that it requires no complex sample handling equipment, little maintenance and skill to operate, and permits fast and continuous monitoring of the nitric oxide content of a gas sample stream.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures, methods and materials.

What is claimed is:

1. A method of determining nitric oxide in a sample gas stream comprising the steps of:
   providing scrubber means capable of scrubbing at least ozone from a gas stream containing nitrogen dioxide without appreciably affecting the nitrogen dioxide content of the gas stream;
   reacting the nitric oxide in the sample gas stream with at least the stoichiometric amount of ozone so as to completely convert the nitric oxide into nitrogen dioxide;
   conveying the resulting nitrogen dioxide containing gas stream to said scrubber means; and
   thereafter determining the nitrogen dioxide content of the gas stream emanating from the scrubber means as a measure of the nitric oxide content of said sample gas stream.

2. A method as set forth in claim 1 wherein:
   the nitric oxide in said gas stream is reacted with an excess amount of ozone so that said resulting gas stream will contain ozone as well as nitrogen dioxide.

3. A method as set forth in claim 1 wherein:
   said ozone is produced by reacting ultraviolet radiation with an oxygen bearing gas.

4. A method as set forth in claim 1 wherein:
   said ozone is produced by generating an electric discharge in an oxygen bearing gas.

5. A method as set forth in claim 1 wherein:
   said scrubber means contains AgO.

6. A method as set forth in claim 1 wherein said sample gas stream contains interferents other than ozone and including the additional steps of:
   providing second scrubber means capable of scrubbing said interferents from said sample gas stream without appreciably affecting the nitric oxide content thereof; and
   passing said sample gas stream through said second scrubber means prior to reacting the stoichiometric amount of ozone with the nitric oxide in the sample gas stream.

7. A method as set forth in claim 6 wherein said second scrubber means contains a material selected from the group consisting of $Ca(OH)_2$ and KOH.

8. A method as set forth in claim 6 wherein said first-mentioned scrubber means contains AgO.

9. A method as set forth in claim 6 wherein said first-mentioned scrubber means scrubs ozone by thermal decomposition thereof.

10. A method of continuously monitoring the nitric oxide content of an air sample stream containing interferents comprising the steps of:
    scrubbing the interferents from the air sample stream;
    reacting the nitric oxide in the air sample stream with an excess amount of ozone so as to completely convert the nitric oxide to nitrogen dioxide and also provide ozone in the resulting gas stream;
    scrubbing the ozone from said resulting gas stream; and
    thereafter determining the nitrogen dioxide content of the scrubbed gas stream as a measure of the nitric oxide content of said air sample stream.

11. A method as set forth in claim 10 wherein said ozone is scrubbed from said resulting gas stream by passing the stream over AgO.

12. A method as set forth in claim 11 wherein:
    said interferents are scrubbed by passing the air sample stream over a material selected from the group consisting of $Ca(OH)_2$ and KOH.

13. A method as set forth in claim 11 wherein said excess amount of ozone is provided by:
    passing a second air stream through an activated charcoal scrubber so that interferents are absorbed and a mixture consisting essentially of nitrogen and oxygen is emitted from the scrubber as an effluent; and
    reacting the oxygen bearing effluent from the activated charcoal scrubber with ultraviolet radiation.

14. A method of determining the total nitric oxide and nitrogen dioxide content of a sample gas stream containing interferents comprising the steps of:

reacting the nitric oxide in the sample gas stream with at least the stoichiometric amount of ozone so as to completely convert the nitric oxide into nitrogen dioxide;

passing the resulting gas stream through a scrubber containing AgO to scrub said interferents and any ozone present in the gas stream; and thereafter determining the nitrogen dioxide content of the effluent emanating from said scrubber whereby the total nitric oxide and nitrogen dioxide content of the sample gas stream is determined.

15. An apparatus for determining the nitric oxide content of a sample gas stream comprising:

means for providing a supply of ozone;

a reaction chamber;

means for conveying ozone from said first-mentioned means and the sample gas stream to said reaction chamber whereby the nitric oxide in said sample gas stream will be converted into nitrogen dioxide in the chamber so that a nitrogen dioxide and ozone containing gas stream is emitted from the reaction chamber as an effluent;

scrubber means for scrubbing ozone from said gas stream without appreciably affecting the nitrogen dioxide content of the gas stream so that a nitrogen dioxide containing gas stream is emitted from the scrubber means as an effluent;

means for conveying the effluent from said reaction chamber to said scrubber means;

analyzer means for determining the nitrogen dioxide content of said gas stream; and means for conveying the effluent from said scrubber means to said analyzer means.

16. An apparatus as set forth in claim 15 wherein said scrubber means contains AgO as a scrubber material.

17. An apparatus as set forth in claim 15 wherein said scrubber means contains means capable of thermally decomposing ozone thereby scrubbing the ozone from said gas stream.

18. An apparatus as set forth in claim 15 wherein said means for providing a supply of ozone includes a source of ultraviolet radiation for photo-oxidizing oxygen to ozone.

19. An apparatus as set forth in claim 15 wherein said means for providing a supply of ozone includes means for generating an electric discharge sufficient to convert oxygen into ozone.

20. An apparatus as set forth in claim 15 including:

second scrubber means capable of scrubbing interferents from the sample gas stream without appreciably affecting the nitric oxide content thereof so that a nitric oxide containing gas stream is emitted from the second scrubber means as an effluent; and said sample gas conveying means includes means for introducing the sample gas stream into said second scrubber means and means for delivering the effluent from said second scrubber means to said reaction chamber.

21. An apparatus as set forth in claim 20 wherein said second scrubber means contains a material selected from the group consisting of $Ca(OH)_2$ and KOH as a scrubber material.

22. In an apparatus for continuously monitoring the nitric oxide content of a sample air stream containing interferents, the combination of:

first scrubber means capable of scrubbing interferents from an air stream containing nitric oxide without appreciably affecting the nitric oxide content of the stream so that a nitric oxide containing gas stream is emitted from the first scrubber means as an effluent;

means for introducing the sample air stream into said first scrubber means;

a first reaction chamber wherein nitric oxide in the sample air stream is converted to nitrogen dioxide so that an air stream containing nitrogen dioxide is emitted from the first reaction chamber as an effluent;

means for conveying the effluent from said first scrubber means into said first reaction chamber;

second scrubber means capable of scrubbing both nitric oxide and interferents from an air stream so that an air stream with nitric oxide and interferents removed is emitted from the second scrubber means as an effluent;

means for introducing an air stream into said second scrubber means;

a second reaction chamber containing means for converting oxygen into ozone;

means for conveying the effluent from said second scrubber means through said second reaction chamber into said first reaction chamber;

third scrubber means capable of scrubbing ozone in a gas stream containing nitrogen dioxide without appreciably affecting the nitrogen dioxide content of the gas stream;

analyzer means for determining the nitrogen dioxide content of said gas stream; and means for conveying the effluent from said first reaction chamber through said third scrubber means to said analyzer means.

23. An apparatus as set forth in claim 22 wherein said third scrubber means contains AgO as a scrubber material.

24. An apparatus as set forth in claim 23 wherein said first scrubber means contains a material selected from the group consisting of $Ca(OH)_2$ and KOH as a scrubber material.

* * * * *